US009401055B2

(12) United States Patent
Nishiseko

(10) Patent No.: US 9,401,055 B2
(45) Date of Patent: Jul. 26, 2016

(54) ELECTRONIC CONTROL APPARATUS

(71) Applicant: DENSO CORPORATION, Kariya-city, Aichi-pref. (JP)

(72) Inventor: Takafumi Nishiseko, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/867,281

(22) Filed: Sep. 28, 2015

(65) Prior Publication Data

US 2016/0104332 A1 Apr. 14, 2016

(30) Foreign Application Priority Data

Oct. 13, 2014 (JP) ................................ 2014-209564

(51) Int. Cl.
*G01M 17/00* (2006.01)
*G07C 5/08* (2006.01)

(52) U.S. Cl.
CPC .................................... *G07C 5/0808* (2013.01)

(58) Field of Classification Search
CPC ..................................................... G07C 5/0808
USPC ......................................................... 701/29.1
See application file for complete search history.

(56) References Cited

U.S. PATENT DOCUMENTS 6,314,375 B1 * 11/2001 Sasaki ................... G01M 15/05 702/185
8,340,861 B2 * 12/2012 Lipscomb ............ G07C 5/0808 701/29.1
9,047,718 B2 * 6/2015 Kakinuma ........... G07C 5/0808
2002/0095977 A1 * 7/2002 Maloney ............. F02D 41/0025 D41/25
2002/0174852 A1 * 11/2002 Choi ..................... B60W 10/06 123/339.11
2003/0070423 A1 * 4/2003 Morinaga ............. F01N 3/2006 60/284
2004/0080997 A1 4/2004 Okada et al.
2005/0131585 A1 * 6/2005 Luskin .................... H04L 67/34 701/1
2009/0254243 A1 10/2009 Uchihashi et al.
2010/0023207 A1 1/2010 Maeda et al.
2010/0305814 A1 * 12/2010 Ichikawa ............... G07C 5/085 701/33.4
2010/0324816 A1 * 12/2010 Highstrom ........... G01C 21/367 701/533
2011/0307144 A1 * 12/2011 Wu ........................ G07C 5/008 701/31.4
2012/0221215 A1 * 8/2012 Sugiyama .......... G01C 21/3469 701/51
2013/0110378 A1 * 5/2013 Nakagawa ............. F02D 41/06 701/103
2013/0338855 A1 * 12/2013 Mason ................. G07C 5/0816 701/2

FOREIGN PATENT DOCUMENTS

JP H10-24784 A 1/1998
JP 2004-330892 A 11/2004

* cited by examiner

*Primary Examiner* — Hussein A. Elchanti
(74) *Attorney, Agent, or Firm* — Posz Law Group, PLC

(57) ABSTRACT

An electronic control apparatus includes a controller, a storage, a calculator, and an estimator. The estimator estimates a potential travelling pattern of a vehicle based on a vehicle state during a start-up period. The start-up period is a preliminarily determined period of time right after a turning on of an ignition switch and the potential travelling pattern is an estimated travelling pattern under which the vehicle travels after an elapse of the start-up period. The estimator estimates the potential travelling pattern of the vehicle based on database-stored reference information that indicates a relationship between the vehicle state during the start-up period and an actual travelling pattern of the vehicle after the elapse of the start-up period. When the estimator estimates that the potential travelling pattern of the vehicle is the short distance travel, the controller forcibly starts the malfunction diagnostic before the predetermined diagnostic start condition is satisfied.

8 Claims, 5 Drawing Sheets

FIG. 2

50

| TRAVEL START TIME ZONE | Ns | N |
|---|---|---|
| . . . . . . | . . . . . . | . . . . . . |
| 7:00 — 8:00 | 38 | 12345 |
| . . . . . . | . . . . . . | . . . . . . |
| 11:00 — 12:00 | 703 | 753 |
| . . . . | . . . . . . | . . . . . . |

| TRAVEL START DAY OF THE WEEK | Ns | N |
|---|---|---|
| Monday | 6 | 2469 |
| Tuesday | 2 | 2469 |
| . . . . . . | . . . . . . | . . . . . . |
| Saturday | 298 | 357 |
| Sunday | 398 | 439 |

| NUMBER OF GO-AND-STOPS | Ns | N |
|---|---|---|
| 0—10 | 83 | 13057 |
| 10—20 | 987 | 1503 |
| . . . . . . | . . . . . . | . . . . . . |
| 50—60 | 348 | 357 |
| . . . . . . | . . . . . . | . . . . . . |

ELECTRONIC CONTROL APPARATUS

CROSS REFERENCE TO RELATED APPLICATION

This application is based on Japanese Patent Application No. 2014-209564 filed on Oct. 13, 2014, the disclosures of which is incorporated herein by reference.

TECHNICAL FIELD

The present disclosure relates to an electronic control apparatus that controls an execution frequency of malfunction diagnostics under a predetermined travelling condition.

BACKGROUND

As disclosed in JP H10-24784 A, a technology has been known for monitoring a travelling state of a vehicle and for performing a malfunction diagnostics to various devices equipped to a vehicle. The diagnostics result is remained as vehicle behavior log data.

Recently, in order to monitor malfunction diagnostics performance of the vehicles that have been put on the market, a ratio of the execution number of the malfunction diagnostics to the number of trips of the vehicle is calculated in addition to the diagnostics result. Hereinafter, the ratio of the execution number of the malfunction diagnostics to the number of trips of the vehicle is referred to as a monitoring frequency. For example, one trip means a period from when a controller for controlling the number of trips is powered on to when the controller is powered off. Thus, when the controller for controlling the number of trips is powered on and then is powered off, the controller counts the period as one trip. California Air Resource Board (CARB) published On-Board Diagnostics II (OBD II) that defines a rate-based monitoring law. The rate-based monitoring law requires an equipment of the electronic control apparatus that calculates the monitoring frequency of the diagnostics carried out to the vehicle, and further requires that the monitoring frequency should be higher than a predetermined frequency. In the coming days, in addition to the markets and the areas that are required to adopt the monitoring frequency under the law, the monitoring frequency will be widely used for the on-board diagnostics in other markets and areas.

For example, above-described rate-based monitoring law requires great number of system related items to be diagnosed under the above law. The items related to the system are executed only when the vehicle operates as a system. That is, the system diagnostic requires that the travelling distance of the vehicle is longer than a certain distance, requires the travelling time is longer than a certain period of time, or requires the vehicle travels under a predetermined travelling pattern.

When the travelling of the vehicle ends before the diagnostic of the vehicle is successfully completed caused by a short travel distance or a short travel time, the counting for the number of diagnostics may fail. Thus, the diagnostic, which has not been completed successfully caused by the interruption, may not be counted as one diagnostic. Recently, short distance travel, such as town travel within the town area is increased. Under this circumstance, the monitoring frequency may be decreased caused by the missing count of the diagnostic. Herein, the missing count means the count failure caused by the short travel distance or the short travel time. The decrease of the monitoring frequency may cause an undesirable decrease in the chance to diagnose and evaluate the state of the vehicle and the effect to the environment. Further, regarding the legal aspect, if a law similar to the rate-based monitoring law is made and put into practice in the countries that use vehicles, it is difficult to ensure an observation of the law.

SUMMARY

In view of the foregoing difficulties, it is an object of the present disclosure to provide an electronic control apparatus that restricts a decrease of a monitoring frequency when a vehicle travels for a short distance or travels for a short period of time.

According to an aspect of the present disclosure, an electronic control apparatus includes a controller, a storage, a calculator, and an estimator. The controller performs malfunction diagnostics to a target device equipped to a vehicle. The controller performs each of the malfunction diagnostics in response to a satisfaction of a predetermined diagnostic start condition after a turning on of an ignition switch of the vehicle in a normal case. The storage stores a total number of trips and a total number of the malfunction diagnostics, and the total number of the malfunction diagnostics is counted up by one when each of the malfunction diagnostics is completed successfully. The calculator calculates a ratio of the total number of the malfunction diagnostics to the total number of the trips as a monitoring frequency. The estimator estimates a potential travelling pattern of the vehicle based on a vehicle state during a start-up period. The start-up period is a preliminarily determined period of time right after the turning on of the ignition switch and the potential travelling pattern is an estimated travelling pattern under which the vehicle travels after an elapse of the start-up period. The estimator estimates the potential travelling pattern of the vehicle based on reference information stored in a database. The reference information indicates a relationship between the vehicle state during the start-up period and an actual travelling pattern of the vehicle after the elapse of the start-up period. The potential travelling pattern includes a short distance travel, and the short distance travel is defined as a travel that ends up before a completion of the malfunction diagnostic activated in response to a satisfaction of the predetermined diagnostic start condition. When the estimator estimates that the potential travelling pattern of the vehicle is the short distance travel, the controller forcibly starts the malfunction diagnostic before the predetermined diagnostic start condition is satisfied.

With the above apparatus, a decrease of the monitoring frequency occurred when the vehicle travels for a short distance or travels for a short period of time can be restricted.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram showing partial information stored in a database;

DETAILED DESCRIPTION

Figure 1:
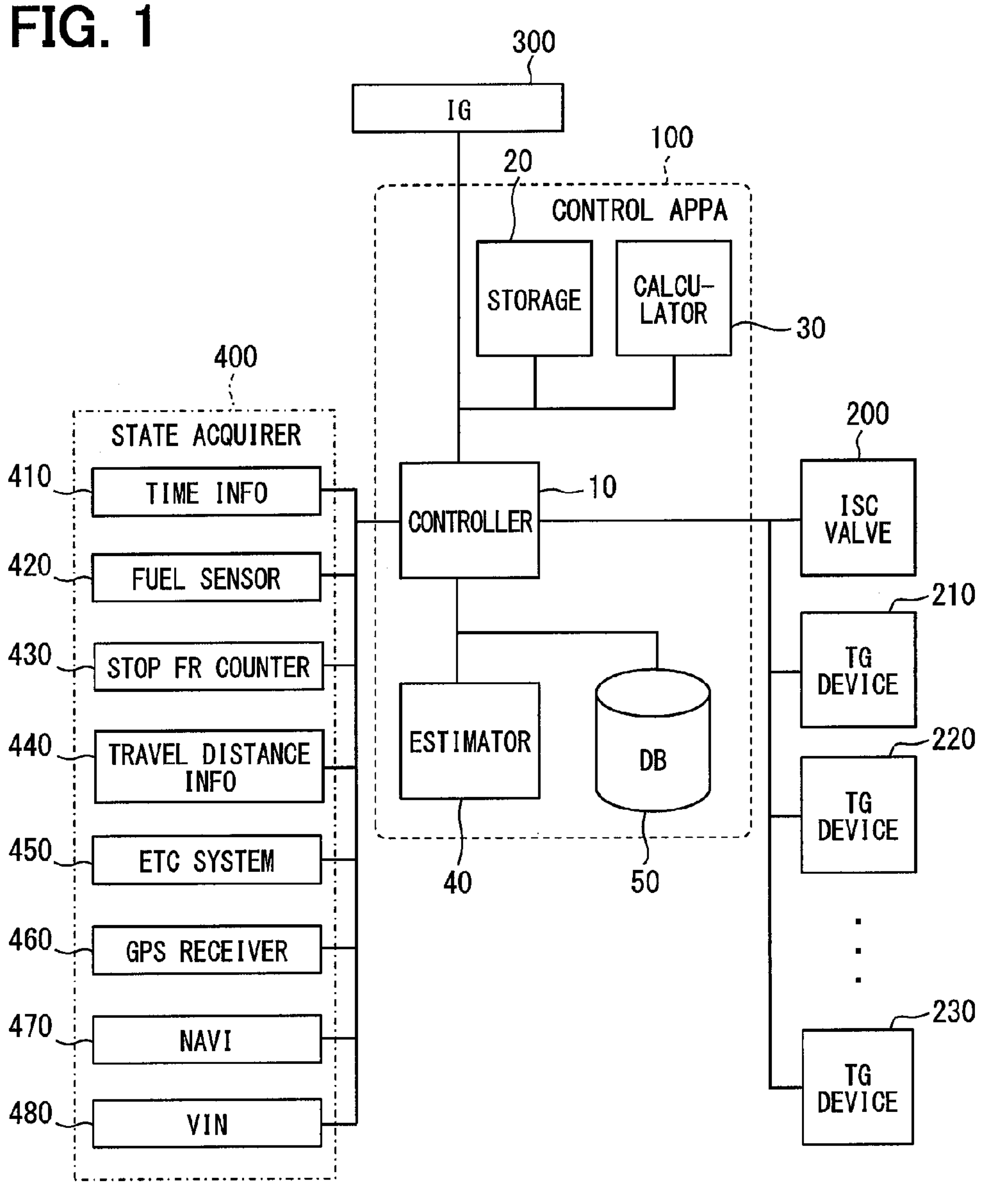
FIG. 1 is a block diagram showing a configuration of an electronic control apparatus according to a first embodiment of the present disclosure.

The following will describe embodiments of the present disclosure with reference to accompanying drawings. In the drawings of the present application, the same reference symbol is used for the same or equal part.

First Embodiment

The following will describe a schematic configuration of an electronic control apparatus according to the present embodiment with reference to FIG. 1 and FIG. 2.

In the present embodiment, the electronic control apparatus 100 is provided to a vehicle, which is equipped with an idling speed control valve 200. Hereinafter, the idling speed control valve is referred to as ISC valve. The ISC valve 200 controls intake air quantity of an engine according to a vehicle state, and controls an opening amount of the valve to maintain a proper rotation speed of the engine during the idling state.

The malfunction diagnostic may be carried out to various target devices (TG DEVICE) 210, 220, 230 other than the ISC valve 200. Hereinafter, the ISC valve 200 will be described as one example of the target device to be diagnosed.

As shown in FIG. 1, the electronic control apparatus (CONTROL APPA) 100 includes a controller 10, a storage 20, and a calculator 30. The controller 10 performs diagnostics to the ISC valve 200 as the target device of the malfunction diagnostic. In the present embodiment, the electronic control apparatus 100 further includes an estimator 40 and a database (DB) 50. The estimator 40 estimates a travelling pattern of the vehicle, and the database 50 stores information related to various travelling patterns.

The controller 10 performs diagnostic to the target device and outputs a signal indicating whether the diagnostic is completed successfully to the storage 20 for counting the number n of diagnostics. The controller 10 also counts the number N of trips. Specifically, when the power of the controller 10 is turned on and then turned off, the controller 10 counts the period from turning on to the turning off of the controller 10 as one trip, and increments the number N of trips by one. As another example, the number N of trips may be counted based on the turning on and turning off of an ignition switch (IG) 300. Further, the number N of trips may also be counted when the vehicle state satisfies a predetermined condition. In this case, the counting of the number N of trips is executed during a turned on state of the controller 10. The controller 10 is communicably connected with the ISC valve 200, the storage 20, the calculator 30, the estimator 40, the database 50, the ignition switch 300, and a state acquirer 400. The controller 10 acquires information from each of the above communicably connected devices. The state acquirer 400 and the operation of the controller 10 will be described later in detail.

The storage 20 stores the number N of trips counted by the controller 10. Specifically, the controller 10 counts a period from a turning on of the ignition switch 300 to a turning off of the ignition switch 300 as one trip. Then, the controller 10 outputs the counted number N of trips to the storage 20. The storage 20 further stores the number n of diagnostics. Specifically, when the diagnostic carried out to the ISC valve 200 completes successfully, the controller 10 increments the number n of diagnostics by one.

The calculator 30 calculates the monitoring frequency based on the number N of trips and the number n of diagnostics stored in the storage 20. Herein, the monitoring frequency is defined as a ratio of the number n of diagnostics to the number N of trips. That is, the monitoring frequency is equal to n/N. The monitoring frequency is calculated every time the number N of trips or the number n of diagnostics is updated, and is stored in the storage 20. As another example, the monitoring frequency may be calculated in response to a request from an external device.

At a turning on time of the ignition switch 300 or after the turning on of the ignition switch 300, the estimator 40 estimates a purpose of a start-up of the vehicle based on the vehicle state during a predetermined start-up period. Herein, the predetermined start-up period is defined as, for example, 15 minutes period of time immediately after the turning on of the ignition switch 300. That is, the estimator 40 estimates a travelling pattern of the current start-up of the vehicle. The travelling pattern may include a medium to long distance travel, a short distance travel, and others. When the travelling pattern is estimated as the medium to long distance travel, the counting miss of the diagnostic is less likely to happen. When the travelling pattern is estimated as the short distance travel, the counting miss of the diagnostic is more likely to happen. That is, when the travelling pattern is estimated as the short distance travel, the monitoring frequency is more likely to decrease. The estimator 40 estimates the travelling pattern of the vehicle by comparing vehicle state information acquired by the state acquirer 400 with the information stored in the database 50. The estimator 40 may also estimate the travelling pattern of the vehicle by comparing internal information of the electronic control apparatus 100 with the information stored in the database 50.

The predetermined start-up period may be defined by an absolute time or by an absolute distance. For example, when the vehicle is equipped with a navigation system, a distance from a position where the ignition switch 300 is turned on to a main road may be set as the absolute distance. For example, when the vehicle is equipped with the navigation system, a time required for travelling from the position where the ignition switch 300 is turned on to the main road may be set as the absolute time.

The estimator 40 estimates the travelling pattern of the vehicle based on the vehicle state corresponding to at least one of a time point or vehicle position during the start-up period.

The database 50 stores the vehicle state at the turning on time of the ignition switch 300 in relation to the travelling pattern of the vehicle. The database 50 provides the stored information to the controller 10 and the estimator 40. The database 50 stores multiple records of information. FIG. 2 shows some records of the information stored in the database 50. FIG. 2 shows three types of information. In first type information, each record includes the number Ns of short distance travels and the number N of trips, and each record is correlated to corresponding travel start time zone. In second type information, each record includes the number Ns of short distance travels and the number N of trips, and each record is correlated to corresponding day of the week when the travel is performed. In third type information, each record includes the number Ns of short distance travels and the number N of trips, and each record is correlated to the number of movements of the vehicle during the predetermined start-up period after the ignition switch 300 is turned on. Herein, the number of movements is equal to the number of go-and-stops of the vehicle.

The estimator 40 compares the information stored in the database 50 with the vehicle state corresponding to the turning on time of the ignition switch 300 for estimating the travelling pattern of the vehicle. Herein, the turning on time of the ignition switch 300 is equal to a start-up time of the vehicle. For example, when the vehicle is started up on Saturday, the estimator 40 refers to the database information related to day of the week. As shown in FIG. 2, in the travelling pattern information stored in the database 50, the number N of trips corresponding to Saturday is equal to 357 and the number Ns of short distance travels corresponding Saturday is equal to 298. That is, in the subject vehicle, the frequency of the short distance travel on Saturday is higher than the frequency of the short distance traveling on Monday or Tuesday. Thus, the estimator 40 estimates the travelling pattern of the subject vehicle as the short distance travel when the subject vehicle is started up on Saturday. Further, the factor referred in the estimation of the travelling pattern is not limited to day of the week. The travelling pattern may be estimated in a comprehensive manner based on the vehicle state information acquired by the state acquirer 400 and internal information of the electronic control apparatus 100. When the travelling pattern of the vehicle is estimated in comprehensive manner, an estimation accuracy of the travelling pattern may be improved.

The travelling pattern is a parameter that indicates what kind of travel the vehicle is performing after the predetermined start-up period has elapsed from the start-up time of the vehicle. As the travelling pattern, one of the medium to long distance travel, short distance travel, or others can be estimated. The short distance travel is a travel that has a short travelling distance or short travelling time. In the present embodiment, the short distance travel is defined as a travel during which the diagnostic that has been started under a normal diagnostic start condition cannot be completed successfully caused by the short travelling distance or the short travelling time. The medium to long distance travel is a travel that has a medium to long travelling distance or medium to long travelling time. In the present embodiment, the medium to long distance travel is a travel during which the diagnostic that has been started under a normal diagnostic start condition can be completed successfully. The travelling pattern may be divided into more detailed travels other than the medium to long distance travel, short distance travel, and others. In the present embodiment, the travelling pattern is divided into above-described three kinds of travels.

The information stored in the database 50 is updated in response to each travel of the vehicle. Thus, the reliability of the correlation between the vehicle state and the travelling pattern can be improved.

The state acquirer 400 may be provided by a sensor that detects a physical quantity, such as a speed. The state acquirer 400 may also be provided by an information manager that manages various kinds of information, such as time point information or travelling distance information. The state acquirer 400 may also be the information itself. The following will describe an exemplary configuration of the state acquirer 400 provided in the present embodiment. As shown in FIG. 1, the state acquirer 400 according to the present embodiment includes time information (TIME INFO) 410 indicating time and day of the week, a fuel sensor 420 detecting and acquiring remaining amount of fuel, a stop frequency counter (STOP FR COUNTER) 430 counting the go-and-stop times of the vehicle during the start-up period, an average travelling distance storing device (TRAVEL DISTANCE INFO) 440 calculating and storing a travelling distance per start-up based on a total travelling distance and a total number of start-ups, an electronic toll collection (ETC, registered trademark) system 450, a global positioning system (GPS) receiver 460, a navigation system (NAVI) 470, and vehicle identification number (VIN) 480.

Figure 3:
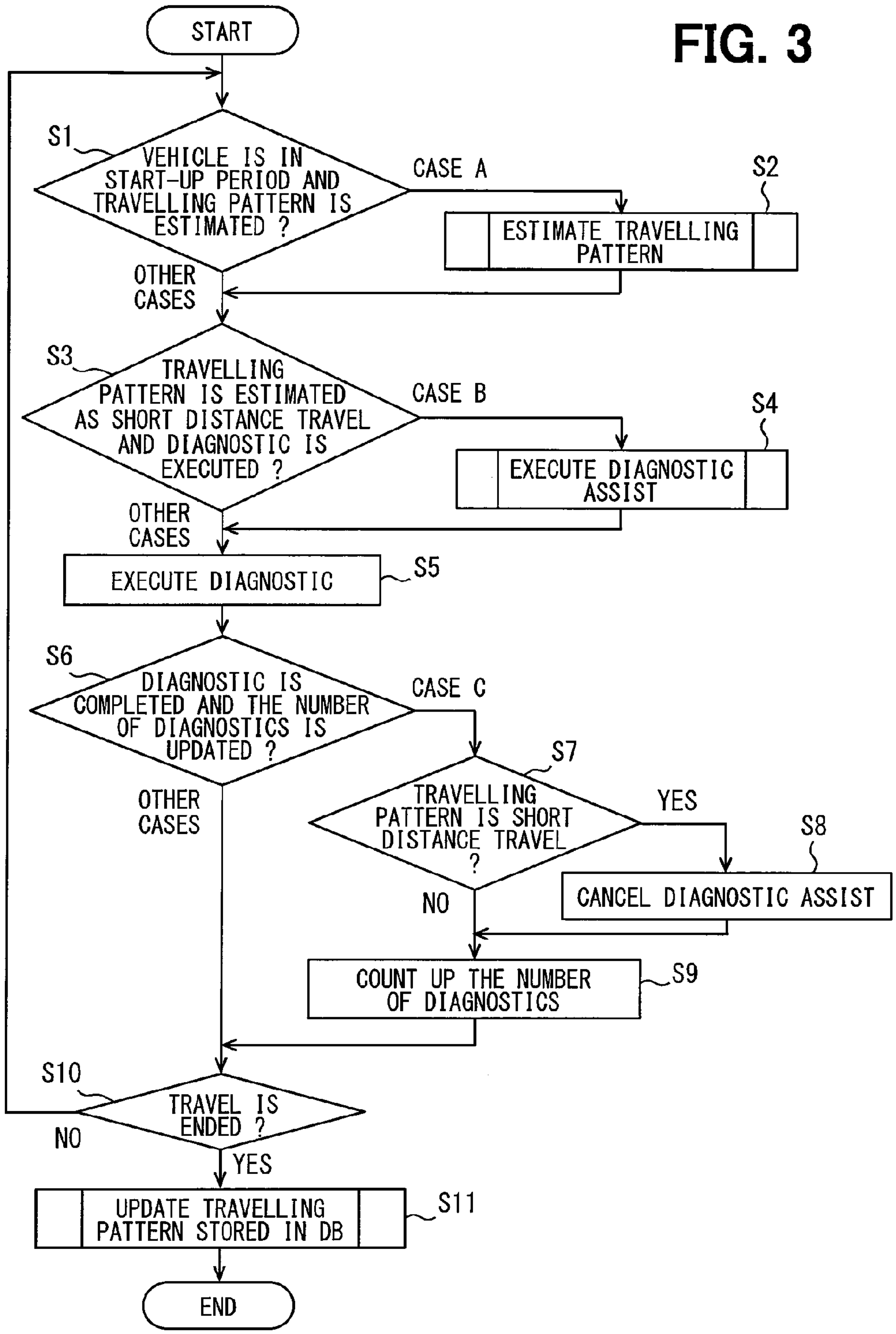
FIG. 3 is a flowchart showing a main routine of the electronic control apparatus.
Figure 4:
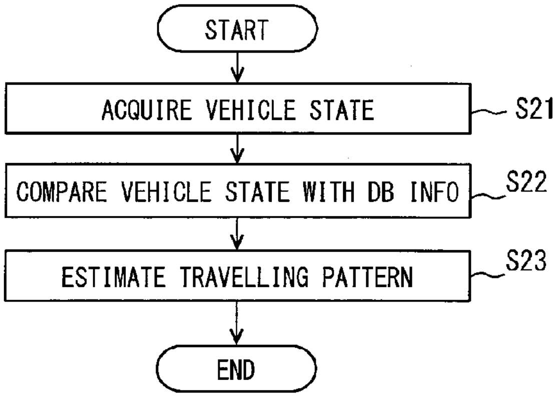
FIG. 4 is a flowchart showing a sub routine included in the main routine of the electronic control apparatus.
Figure 5:
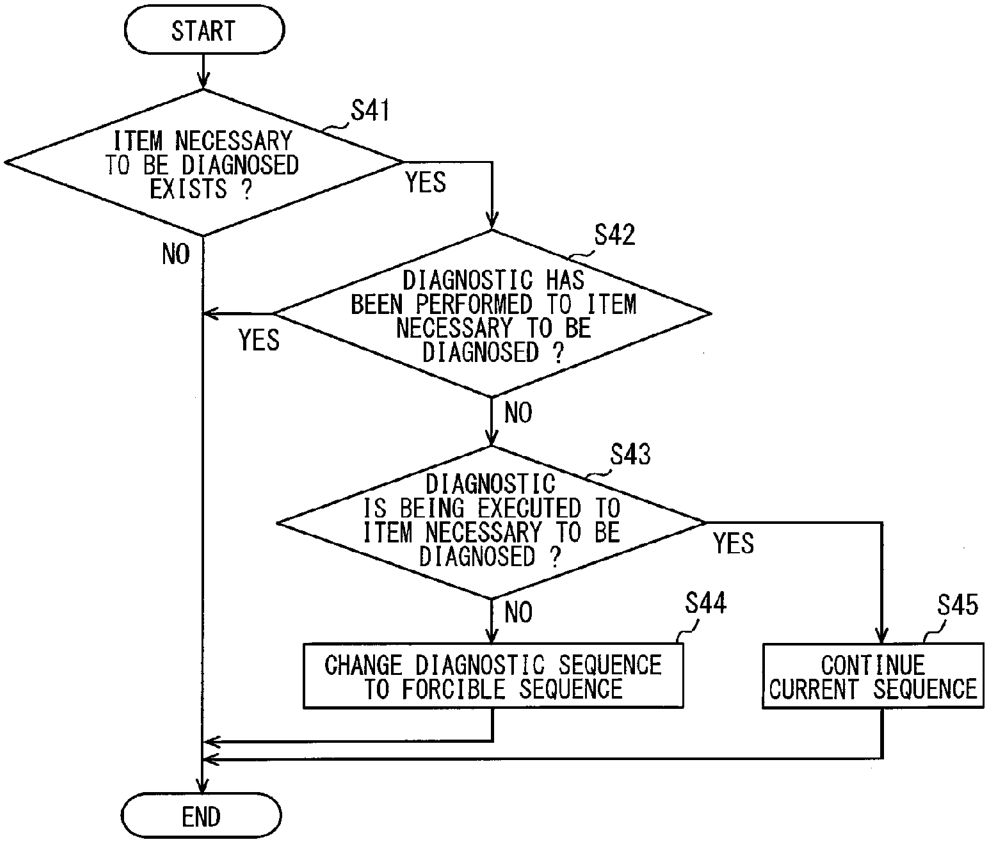
FIG. 5 is a flowchart showing another sub routine included in the main routine of the electronic control apparatus.
Figure 6:
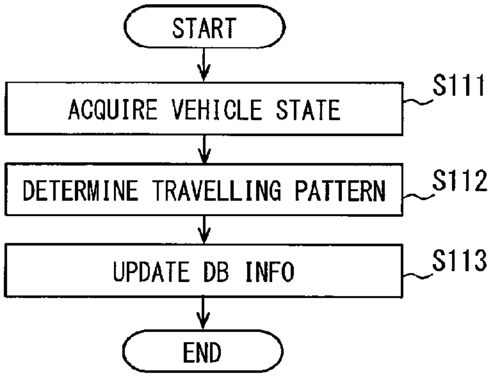
FIG. 6 is a flowchart showing another sub routine included in the main routine of the electronic control apparatus.

The following will describe a process executed by the electronic control apparatus 100 for performing a diagnostic assist according to the present embodiment with reference to FIG. 3 to FIG. 6. FIG. 3 shows a main routine of the process. FIG. 4 shows a subroutine of the process executed at S2. FIG. 5 shows a subroutine of the process executed at S4. FIG. 6 shows a subroutine of the process executed at S11.

As shown in FIG. 3, when the controller 10 starts the process, at S1, the controller 10 determines whether the vehicle is in the start-up period and further determines whether the estimation of the travelling pattern has been carried out. When the vehicle is in the start-up period but the estimation of the travelling pattern has not been carried out, that is, the determination result corresponds to case A, the controller 10 proceeds to S2. In other cases, the controller 10 proceeds to S3.

At S2, the controller 10 and the estimator 40 estimate a potential travelling pattern of the vehicle. The detailed process executed at S2 is shown in the flowchart of FIG. 4.

As shown in FIG. 4, when S2 starts, the controller 10 executes S21. At S21, the controller 10 receives various kinds of information from the state acquirer 400. That is, the controller 10 acquires vehicle state during the start-up period from the state acquirer 400, and temporarily stores the vehicle state. The vehicle state may include the time point and day of the week when the vehicle is started up, the remaining amount of fuel, and other information.

After S21, the estimator 40 executes S22. At S22, the estimator 40 refers to the information stored in the database 50, and compares the vehicle state acquired at S21 with the information stored in the database 50. As described above, the database 50 stores various kinds of information as shown in FIG. 2.

After S22, the estimator 40 executes S23. At S23, the estimator 40 preliminarily estimates the potential travelling pattern of the vehicle based on the current vehicle state and the information stored in the database 50.

As an example, suppose that the ignition switch 300 is turned on at 7:30 on Saturday. In this case, the controller 10 receives the time information 410 from the state acquirer 400, and outputs day of the week and the time point to the estimator 40. Then, the estimator 40 refers to the information stored in the database 50.

As shown in FIG. 2, the number Ns of short distance travels during time period 7:00 to 8:00 is equal to 38 and the number N of trips during time period 7:00 to 8:00 is equal to 12345. Thus, during time period 7:00 to 8:00, the ratio of the number Ns of short distance travels to the number N of trips is equal to 0.3%. With similar method, during time period 11:00 to 12:00, the ratio of the number Ns of short distance travels to the number N of trips is calculated as 93%. The ratio during time period 7:00 to 8:00 is substantially lower than the ratio during other time periods, for example, 11:00 to 12:00. Thus, the estimator 40 can estimate the travelling pattern of the vehicle as medium to long distance travel or others based on the time point information.

The estimation based on day of the week is carried out in a similar method with above-described estimation. As shown in FIG. 2, the number Ns of short distance travels on Saturday is equal to 298 and the number N of trips on Saturday is equal to 345. Thus, on Saturday, the ratio of the number Ns of short distance travels to the number N of trips is equal to 83%. With similar method, on Monday, the ratio of the number Ns of short distance travels to the number N of trips is calculated as 0.2%. Thus, the ratio on Saturday is substantially higher than the ratio on other days, for example, Monday. Thus, the estimator 40 can estimate the travelling pattern of the vehicle as short distance travel based on the day of the week information.

Further, the estimator 40 may estimates the travelling pattern by analyzing the time and day of the week in comprehensive manner. There will be many kinds of analysis methods. For example, a ratio of the number Ns of short distance travels to the number N of trips during each hour on each day of the week may be stored as reference parameters in the database 50. Then, the travelling pattern can be estimated based on the reference parameters considering time and day of the week together in comprehensive manner.

As another method, the go-and-stop times counted by the stop frequency counter 430 during the start-up period right after the turning on of the ignition switch 300 may be used in the estimation of the travelling pattern. Usually, in the short distance travel within the town area, a stop frequency will be increased caused by the stop sign or the traffic light at an intersection, and this may cause an increase of the go-and-stop times. That is, as shown in FIG. 2, when the number of go-and-stops increases, the ratio of the number Ns of short distance travels to the number N of trips increases. The estimator 40 may estimate the travelling pattern of the vehicle as the short distance travel when the number of go-and-stops is included in a range for which the ratio of the number Ns of short distance travels to the number N of trips is higher than a predetermined level. For example, the predetermined level may be set as 30%. In FIG. 2, for the go-and-stop times range of 10 to 20 or range of 50 to 60, the ratio of the number Ns of short distance travels to the number N of trips is higher than 30%. Thus, in a trip, when the actually detected number of go-and-stops is within the range of 10 to 20 or within the range of 50 to 60, the travelling pattern may be estimated as the short distance travel.

After S23, the controller 10 returns to S3 of the main routine.

As described above, S3 is executed when the determination result at S1 is other than case A. S3 is also executed after S23 of S2. At S3, the controller 10 determines whether the travelling pattern is estimated as the short distance travel and the diagnostic has been executed. When the travelling pattern is estimated as the short distance travel but the diagnostic has not been executed, that is, the determination result at S3 corresponds to case B, the controller 10 proceeds to S4. In other cases, the controller 10 proceeds to S5. When the determination result at S1 is other than case A and thus S3 is directly executed without execution of S2, the estimation of the travelling pattern is not carried out. Thus, the determination result at S3 inescapably comes out as other case.

At S4, the controller 10 changes an execution sequence of the diagnostic to start the diagnostic at an earlier time than the normal diagnostic regardless of whether the normal diagnostic start condition necessary for the start of the normal diagnostic is satisfied or not. That is, the controller 10 starts the diagnostic when a minimalist condition is satisfied. Hereinafter, an execution state of the diagnostic that starts earlier than the normal diagnostic is referred to as a diagnostic assist state, and the diagnostic that starts earlier than the normal case is referred to as an early diagnostic. The detailed process executed at S4 is shown in the flowchart of FIG. 5.

As shown in FIG. 5, when S4 starts, the controller 10 executes S41. At S41, the controller 10 determines an existence of a predetermined item. Herein, the predetermined item may be an item required to be diagnosed, for example, under the law, or may be an item required to be diagnosed at an earlier time. In the flowchart shown in FIG. 5, this predetermined item is described as item necessary to be diagnosed. When the controller 10 determines that there does not exist the predetermined item (S41: NO), that is, when the forced execution of the diagnostic is not necessary, the controller 10 proceeds to S5. At S5, the controller 10 executes the diagnostic when the normal diagnostic start condition is satisfied. When the controller 10 determines that there exists the predetermined item (S41: YES), the controller 10 proceeds to S42.

At S42, the controller 10 determines whether the diagnostic has been carried out to the predetermined item necessary to be diagnosed. When the diagnostic to the item necessary to be diagnosed has been carried out and has been completed (S42: YES), the controller 10 proceeds to S5. At S5, the controller 10 executes the diagnostic when the normal diagnostic start condition is satisfied. When the diagnostic to the item necessary to be diagnosed has not been completed (S42: NO), the controller 10 proceeds to S43.

At S43, the controller 10 determines whether the diagnostic to the item necessary to be diagnosed is in an execution state. Herein, the execution state is a state in which the diagnostic is being carried out to the item necessary to be diagnosed. When the controller 10 determines that the diagnostic to the item necessary to be diagnosed is in the execution state (S43: YES), the controller 10 proceeds to S45. At S45, the controller 10 continues the execution sequence of the diagnostic. When the controller 10 determines that the diagnostic to the item necessary to be diagnosed is not in the execution state (S43: NO), the controller 10 proceeds to S44. The NO determination at S43 indicates an existence of non-diagnosed item, which is necessary to be diagnosed but not yet diagnosed.

At S44, the controller 10 changes an execution sequence of the diagnostic from a normal sequence to an enforced sequence. That is, controller 10 changes an execution sequence of the diagnostic from the normal sequence to the diagnostic assist state. In the normal sequence, the controller 10 performs the diagnostic when the normal diagnostic start condition is satisfied. In the enforced sequence, that is, in the diagnostic assist state, the diagnostic is carried out forcibly regardless of the normal diagnostic start condition. As described above, in the present embodiment, the target device of the diagnostic is provided by the ISC valve 200 as an example.

In the ISC valve 200, for example, when a voltage applied to the both ends of the solenoid, a current flowing through the solenoid, an idling rotation speed, or a valve opening amount relative to the current flowing through the solenoid in a fully open state of the throttle is corrected in real time during a travel of the vehicle, the normal diagnostic start condition is considered as satisfied. The diagnostic is carried out by changing the target idling rotation speed or changing the target opening amount of the ISC valve 200.

At S44, the controller 10 changes a start condition of the diagnostic for the ISC valve 200. Specifically, in the above-described real time correction, a previous correction result can be used. By using the previous correction result, the time required for the correction can be saved. When the vehicle stops for a period of time due to a traffic signal or the like, the sequence is changed so that the target idling rotation speed or the target opening amount of the ISC valve 200 is changed forcibly. With this configuration, the throttle opening amount of the ISC valve 200 is changed forcibly with the stop of the vehicle as a trigger, and the diagnostic can be carried out forcibly.

When S44 or S45 is ended, the controller 10 returns to S5 of main routine.

S5 is carried out when determination result at S3 corresponds to other case. S5 is also executed after S44 or S45 of S4. At S5, the controller 10 performs the diagnostic to the target item of the target device. Then, the controller 10 proceeds to S6.

At S6, the controller 10 determines whether the diagnostic has been completed and further determines whether the number n of diagnostics has been updated. The update of the number n of diagnostics is also referred to as a count-up. When the controller 10 determines that the diagnostic has been completed but the number n of diagnostics has not been updated, that is, the determination result corresponds to case C, the controller 10 proceeds to S7. In other cases, the controller 10 proceeds to S10.

At S7, the controller 10 determines whether the travelling pattern of the vehicle is the short distance travel or not. When the controller 10 determines that the travelling pattern is the short distance travel at S7 (S7: YES), the controller 10 proceeds to S8. When the controller 10 determines that the travelling pattern is not the short distance travel at S7 (S7: NO), the controller 10 proceeds to S9.

At S8, the controller 10 cancels the sequence change to the diagnostic assist state made at S4, and sets the diagnostic sequence back to the normal execution sequence. That is, at S8, the controller 10 deactivates the sequence change made at S4. After S8, the controller 10 proceeds to S9.

At S9, the controller 10 updates the number n of diagnostics. As described above, the update of the number n of diagnostics is also referred to as count-up. As described above, S9 is carried out when the determination result at S6 corresponds to the case C. Since the diagnostic executed at S5 is determined to be completed at S6, the number n of diagnostics is counted up in spite of the case that the item was diagnosed under the normal diagnostic start condition or the item was diagnosed forcibly. After S9, the controller 10 proceeds to S10.

At S10, the controller 10 determines whether the vehicle has ended the travel. When the ignition switch 300 of the vehicle is still in the ON state, the controller 10 determines that the vehicle still continues the travel (S10: NO), and returns to S1. Then, processes at S1 to S10 are repeatedly executed until the vehicle ends the travel so that the diagnostic can be carried out to other kinds of diagnostic items. When the ignition switch 300 of the vehicle is in the OFF state, the controller 10 determines that the vehicle has ended the travel (S10: YES), and proceeds to S11.

At S11, the controller 10 updates the information stored in the database 50. Specifically, the controller 10 updates the vehicle state and the travelling pattern during the start-up period. Herein, the vehicle state and the travelling pattern are correlated to each other in the database 50. The detailed process executed at S11 is shown in the flowchart of FIG. 6.

As shown in FIG. 6, when S11 starts, the controller 10 executes S111. Process executed at S111 is similar to the process executed at S21. At S111, the controller 10 receives various kinds of information that are transmitted from the state acquirer 400. That is, the controller 10 acquires vehicle state during the start-up period from the state acquirer 400, and temporarily stores the vehicle state. The vehicle state includes the time point and day of the week when the vehicle is started up, the remaining amount of fuel, and others. In a case where the acquired information is still remained at an execution start time of S111 after execution of S21, information acquirement executed at S111 may be skipped. After S111, the controller 10 proceeds to S112.

At S112, the controller 10 determines the actual travelling pattern of the vehicle after the elapse of the predetermined start-up period based on the actual driving behavior of the vehicle after the elapse of the start-up period. For example, when the vehicle travels only a short distance or travels for only a short time and the travel ends up before the completion of the diagnostic that has started under the normal diagnostic start condition, the travelling pattern is determined as the short distance travel. When the vehicle travels a certain distance or travels for a certain time and the diagnostic that has started under the normal diagnostic start condition can be sufficiently completed during the travel, the travelling pattern is determined as the medium to long distance travel. After S112, the controller 10 proceeds to S113.

At S113, the controller 10 updates the information stored in the database 50 with the vehicle state acquired at S111 and the travelling pattern determined at S112. Herein, the vehicle state and the travelling pattern are correlated with each other, the vehicle state acquired at S111 is the vehicle state during the start-up period, and the travelling pattern determined at S112 is the actual travelling pattern after the elapse of the start-up period. For example, suppose that the ignition switch 300 is turned on at 7:30 on Saturday and the actual travelling pattern of the vehicle is the short distance travel. In this case, in the information related to the start time of the travel in FIG. 2, the number Ns of short distance travels corresponding to the travel start time of 7:00 to 8:00 is incremented by one, and the number N of trips corresponding to the travel start time of 7:00 to 8:00 is incremented by one. Further, in the information related to day of the week, the number Ns of short distance travels corresponding to Saturday is incremented by one, and the number N of trips corresponding to Saturday is incremented by one.

The number N of trips may be incremented by one at a proper timing from a turning on time of the ignition switch 300 to an end of S11 in FIG. 3. The storage 20 stores updated number N of trips and updated number n of diagnostics. The calculator 30 calculates the monitoring frequency n/N based on the updated number N of trips and updated number n of diagnostics. The calculation of the monitoring frequency n/N may be carried out at a proper timing after update of the number n of diagnostics at S9 and before the turning off of the ignition switch 300.

As described above, the execution of the process shown in FIG. 3 is carried out by the electronic control apparatus 100.

Figure 7:
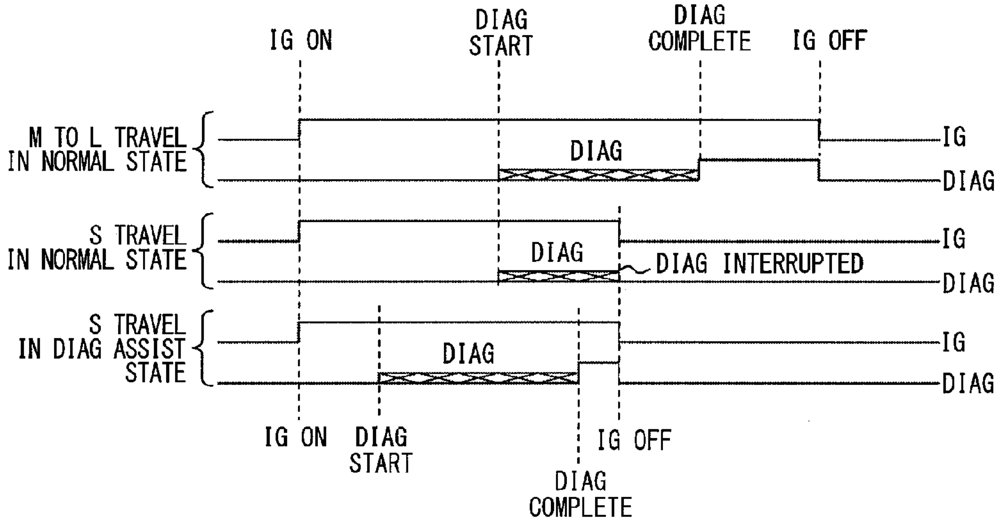
FIG. 7 is a diagram showing timing charts of diagnostics in normal state and diagnostic assist state.

The following will describe advantages provided by the electronic control apparatus 100 according to the present embodiment. FIG. 7 shows operation states of the diagnostic process during a period from the turning on of the ignition switch 300 to the turning off of the ignition switch 300. The upper timing chart shows the diagnostic executed under the normal diagnostic start condition in the medium to long distance travel (M TO L TRAVEL IN NORMAL STATE), the middle timing chart shows the diagnostic executed under the normal diagnostic start condition in the short distance travel (S TRAVEL IN NORMAL STATE), and the lower timing chart shows the diagnostic executed under diagnostic assist state in the short distance travel (S TRAVEL IN DIAG ASSIST STATE).

As shown in the upper timing chart of FIG. 7, when the travel distance or the travel time is medium to long, diagnostic can be completed successfully before the turning off of the ignition switch 300 even though the diagnostic is executed under the normal diagnostic start condition. Thus, the number n of diagnostics can be properly counted up without counting miss.

As shown in the middle timing chart of FIG. 7, when the travel distance or the travel time is short, diagnostic executed under the normal diagnostic start condition cannot be completed successfully before the turning off of the ignition switch 300. In this case, since the diagnostic cannot be completed properly, the number n of diagnostic is not counted up caused by the failure of the successful completion of the diagnostic.

In the electronic control apparatus 100 according to the present embodiment, when the potential travelling pattern of the vehicle, that is, the travelling pattern in the coming period after the elapse of the start-up period is estimated as the short distance travel based on the vehicle state during the start-up period, the diagnostic assist is carried out. That is, the diagnostic is forcibly activated to start before the diagnostic start condition is satisfied. Thus, as shown in the lower timing chart of FIG. 7, the diagnostic can be started at an earlier time compared with the normal diagnostic shown in the middle and upper timing charts of FIG. 7. Since the diagnostic is started at an earlier time, the diagnostic can be completed successfully before the turning off of the ignition switch 300 even in the short distance travel. Accordingly, the counting miss of the diagnostics can be decreased, and decrease of the monitoring frequency in the short distance travel can be restricted. As described above, the short distance travel is a travel carried out for a short distance or for a short period of time.

First Modification

In the diagnostic assist state, it is preferable to perform the diagnostic under the same condition with the diagnostic carried out under the normal diagnostic start condition. However, in the diagnostic assist state, the diagnostic needs to be carried out forcibly before the normal diagnostic start condition is satisfied. Thus, the standard related to the diagnostic execution can be relaxed for performing the diagnostic in a simplified manner. That is, the condition for performing the diagnostic may be relaxed, or the determination condition for determining normality or abnormality may be relaxed.

For example, in the diagnostic assist state, the current flowing time in the solenoid for driving the ISC valve 200 can be shortened compared with a normal case. As another example, in the diagnostic assist state, when performing diagnostic for detecting short-circuit in the load, the threshold value for detecting the overcurrent can be relaxed compared with a normal case.

As a further simplified configuration, the input to the ISC valve 200 can be forcibly changed, and the response amount of the output with respect to the change amount of the input can be confirmed for activating the diagnostic assist. Herein, the output may be the opening amount of the valve.

Second Modification

The number n of diagnostics corresponding to the diagnostics that are started under the normal diagnostic start condition may be counted independently from the number n of diagnostics corresponding to the diagnostics that are performed under the diagnostic assist state. That is, the number n of diagnostics may include the first number n1 of diagnostics corresponding to the diagnostics that are started under the normal diagnostic start condition and the second number n2 of diagnostics corresponding to the diagnostics that are performed under the diagnostic assist state. The first number n1 of diagnostics corresponding to the diagnostics that are started under the normal diagnostic start condition is also referred to as a normal diagnostic execution number. The second number n2 of diagnostics corresponding to the diagnostics that are performed under the diagnostic assist state is also referred to as a forced diagnostic execution number.

In the diagnostic assist state, the diagnostic is forcibly started even though the normal diagnostic start condition is not satisfied. Thus, in many cases, the vehicle state during diagnostic is different from the vehicle state during the normal diagnostic. Further, as described in the foregoing first modification, the standard for the diagnostic can be relaxed. By counting the number n of diagnostics corresponding to the diagnostics that are started under the normal diagnostic start condition independently from the counting of the number n of diagnostics corresponding to the diagnostics that are performed under the diagnostic assist state, the two kinds of counting number can be clearly indicated and can be managed independently.

In the above configuration, suppose that, after the diagnostic under the assist state is carried out forcibly and the second number n2 of diagnostics is correspondingly counted up, the diagnostic is repeatedly carried out to the same item in response to the satisfaction of the normal diagnostic start condition. In this case, the previous count-up of the second number n2 of diagnostics is canceled, and the first number n1 of diagnostics indicating the number of the diagnostics carried out under the normal diagnostic start condition is counted up.

Third Modification

In the foregoing embodiment, in order to estimate the travelling pattern, the state acquirer 400 includes the time information 410, the stop frequency counter 430 and the like. As another example, the travelling pattern of the vehicle can be determined based on the vehicle state.

The state acquirer 400 includes the fuel sensor 420 detecting and acquiring remaining amount of the fuel. The estimator 40 may estimate the travelling pattern of the vehicle as the short distance travel when the remaining amount of the fuel is less than a predetermined threshold value. This estimation is made under a presumption that the vehicle cannot perform the medium to long distance travel with the fuel amount less than the threshold value. The fuel amount may be increased by a refueling. However, during the refueling, the ignition switch 300 is usually turned off. Thus, the estimation of the travelling pattern as the short distance travel based on the amount of the fuel less than the threshold value can be established even when the case of refueling is considered.

The state acquirer 400 includes the average travelling distance storing device 440. As described above, the average travelling distance storing device 440 calculates and stores the average travelling distance per start-up based on the total travelling distance and the total number of start-ups of the vehicle. Herein, one start-up corresponds to one trip of the vehicle. When the average travelling distance per start-up calculated by the average travelling distance storing device 440 is shorter than a predetermined threshold value, the travelling pattern of the vehicle can be estimated as the short distance travel.

The state acquirer 400 includes the electronic toll collection system 450. Hereinafter, the electronic toll collection system 450 is also referred to as ETC 450. As an example employing the ETC 450, the travelling pattern can be estimated according to an ETC card insert state. When the ETC card is in the inserted state, the estimator 40 may estimate the travelling pattern of the vehicle as the medium to long distance travel.

As another example employing the ETC 450, the travelling pattern may be estimated by a checker that checks whether the ETC card has been inserted properly before passing through a toll gate for entering a toll road. When the driving of the vehicle is interrupted by the checker, the estimator 40 may determine that the vehicle is going to pass through the toll gate for entering the toll road. Thus, in this case, the estimator 40 can estimate the travelling pattern of the vehicle as the medium to long distance travel.

The state acquirer 400 includes the GPS receiver 460 and the navigation system 470. For example, when the present position of the vehicle acquired by the GPS receiver 460 is specified as a supermarket or a shopping center, the estimator 40 may estimate the travelling pattern of the vehicle as the short distance travel. The travelling pattern of the vehicle may also be estimated based on the present position of the vehicle acquired by the GPS receiver 460 and the destination of the vehicle designated in the navigation system 470. When the distance from the present position to the destination is shorter than a predetermined threshold value, the estimator 40 may estimate the travelling pattern of the vehicle as the short distance travel.

The state acquirer 400 includes the information related to the vehicle identification number (VIN) 480. VIN is an identification serial number assigned to a vehicle. By accessing to a remote center that manages VIN of vehicles, the vehicle class, owner, main driver and gender of the main driver, use purpose of the vehicle and the like can be specified. The controller 10 may transmit VIN to the remote center, and acquires above-described information related to the vehicle. The estimator 40 may estimate the travelling pattern based on the acquired information related to the vehicle. For example, when the vehicle class is a lightweight vehicle, the travelling pattern is more likely to be estimated as the short distance travel. For reference, in Japan, lightweight vehicle is defined as a vehicle with an engine up to 660 cc and 64 bhp. When the vehicle class is a bus, the travelling pattern is more likely to be estimated as the medium to long distance traveling. With above-described statistical data of the travelling pattern according to the vehicle class, the estimator 40 can estimate the travelling pattern of the vehicle. Further, when the vehicle is owned by a business operator, the travelling pattern is more likely to be estimated as the medium to long distance traveling. When the vehicle is owned by a housewife, the travelling pattern is more likely to be estimated as the short distance traveling. With above-described statistical data of the travelling pattern according to the owner, the estimator 40 can estimate the travelling pattern of the vehicle.

The travelling pattern may also be estimated based on position setting information of a passenger seat in a compartment of the vehicle. Some of the vehicles provide a function for registering the position setting information of the passenger seat corresponding to a passenger. After the passenger turns on the ignition switch 300 and sets the position of the seat according to the registered seat position, the estimator 40 can specify the passenger. Then, the estimator 40 can acquire the travelling patterns corresponding to the specified passenger from the database 50, and estimates the travelling pattern of the passenger.

The travelling pattern of the vehicle may be estimated in a comprehensive manner based on a combination of (i) the method according to the first embodiment, (ii) the sensors and the information included in the state acquirer 400, and (iii) information acquired from other devices.

Other Embodiments

In the foregoing embodiments and modifications, the electronic control apparatus 100 includes the database 50. As another example, the database 50 may be an external database provided outside of the electronic control apparatus 100. The database 50 may also be an external database provided outside of the vehicle. In this case, the electronic control apparatus 100 may include a transceiver that communicates with the database 50 in wireless manner in order to transmit or receive information. Specifically, in this case, the database 50, the controller 10, and the estimator 40 may be communicably connected with each other in wireless manner.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An electronic control apparatus comprising:

a controller performing malfunction diagnostics to a target device equipped to a vehicle, the controller performing each of the malfunction diagnostics in response to a satisfaction of a predetermined diagnostic start condition after a turning on of an ignition switch of the vehicle in a normal case;

a storage storing a total number of trips and a total number of the malfunction diagnostics, the total number of the trips being counted up by one when the controller is powered on and then powered off, and the total number of the malfunction diagnostics being counted up by one when each of the malfunction diagnostics is completed successfully;

a calculator calculating a ratio of the total number of the malfunction diagnostics to the total number of the trips as a monitoring frequency; and an estimator estimating a potential travelling pattern of the vehicle based on a vehicle state during a start-up period, the start-up period being a preliminarily determined period of time right after the turning on of the ignition switch and the potential travelling pattern being an estimated travelling pattern under which the vehicle travels after an elapse of the start-up period, wherein the estimator estimates the potential travelling pattern of the vehicle based on reference information stored in a database, and the reference information indicating a relationship between the vehicle state during the start-up period and an actual travelling pattern of the vehicle after the elapse of the start-up period, the potential travelling pattern includes a short distance travel, and the short distance travel is defined as a travel that ends up before a completion of the malfunction diagnostic activated in response to a satisfaction of the predetermined diagnostic start condition, and when the estimator estimates that the potential travelling pattern of the vehicle is the short distance travel, the controller forcibly starts the malfunction diagnostic before the predetermined diagnostic start condition is satisfied.

2. The electronic control apparatus according to claim 1, wherein the vehicle state during the start-up period is provided by one of travel start time point, travel start day of the week, a position of the vehicle during the start-up period, a total number of go-and-stops of the vehicle during the start-up period, remaining amount of fuel during the start-up period, an average travel distance corresponding to one start-up, vehicle identification number, seat position information, or inserted state of an electronic toll collection card, and the estimator estimates the potential travelling pattern of the vehicle based on the vehicle state during the start-up period.

3. The electronic control apparatus according to claim 1, wherein the vehicle state during the start-up period is provided at least two of travel start time point, travel start day of the week, a position of the vehicle during the start-up period, a total number of go-and-stops of the vehicle during the start-up period, remaining amount of fuel during the start-up period, an average travel distance corresponding to one start-up, vehicle identification number, seat position information, or inserted state of an electronic toll collection card, and the estimator estimates the potential travelling pattern of the vehicle based on a comprehensive analysis result of the vehicle state during the start-up period.

4. The electronic control apparatus according to claim 1, wherein the vehicle state during the start-up period is provided by a present position of the vehicle, a predetermined destination of the vehicle, and a distance from the present position to the destination, and the estimator estimates the potential travelling pattern of the vehicle based on the vehicle state during the start-up period.

5. The electronic control apparatus according to claim 1, wherein, after a turning off of the ignition switch, the controller:

acquires vehicle state information including one of travel start time point, travel start day of the week, a travel distance from the turning on of the ignition switch to the turning off of the ignition switch, a travel time from the turning on of the ignition switch to the turning off of the ignition switch, or a total number of go-and-stops of the vehicle during the start-up period;

correlates the vehicle state information with the actual travelling pattern of the vehicle from the turning on of the ignition switch to the turning off of the ignition switch; and updates the vehicle state information and the travelling pattern of the vehicle stored in the database every time new vehicle state information and corresponding new travelling pattern are acquired.

6. The electronic control apparatus according to claim 1, wherein, after a turning off of the ignition switch, the controller:

acquires comprehensive vehicle state information including at least two of travel start time point, travel start day of the week, a travel distance from the turning on of the ignition switch to the turning off of the ignition switch, a travel time from the turning on of the ignition switch to the turning off of the ignition switch, or a total number of go-and-stops of the vehicle during the start-up period;

correlates the comprehensive vehicle state information with the actual travelling pattern of the vehicle from the turning on of the ignition switch to the turning off of the ignition switch; and updates the comprehensive vehicle state information and the travelling pattern of the vehicle stored in the database every time new comprehensive vehicle state information and corresponding new travelling pattern are acquired.

7. The electronic control apparatus according to claim 1, wherein when the malfunction diagnostic is performed forcibly, a standard related to the forcibly performed malfunction diagnostic is relaxed compared with the malfunction diagnostic performed in response to the satisfaction of the predetermined diagnostic start condition.

8. The electronic control apparatus according to claim 1, wherein the total number of the malfunction diagnostics includes a forced diagnostic execution number and a normal diagnostic execution number, the forced diagnostic execution number is counted up by one when one of the malfunction diagnostics is performed forcibly before the satisfaction of the predetermined diagnostic start condition, and the normal diagnostic execution number is counted up by one when one of the malfunction diagnostics is performed in response to the satisfaction of the predetermined diagnostic start condition.

* * * * *